(12) United States Patent
Ordonez et al.

(10) Patent No.: US 11,697,034 B2
(45) Date of Patent: Jul. 11, 2023

(54) METHOD OF USING AN AIRCRAFT EMERGENCY SLIDE CONTAINER AS AN INSTALLATION TOOL FOR DEINSTALLATION AND INSTALLATION OF AIRCRAFT EMERGENCY SLIDES

(71) Applicants: Jose Ordonez, Valencia, CA (US); Neil Waldron, Valencia, CA (US)

(72) Inventors: Jose Ordonez, Valencia, CA (US); Neil Waldron, Valencia, CA (US)

(73) Assignee: Bill Thomas Associates, Inc., Valencia, CA (US)

( * ) Notice: Subject to any disclaimer, the term of this patent is extended or adjusted under 35 U.S.C. 154(b) by 1021 days.

(21) Appl. No.: 16/422,959

(22) Filed: May 24, 2019

(65) Prior Publication Data

US 2020/0047005 A1 Feb. 13, 2020

Related U.S. Application Data

(62) Division of application No. 14/214,597, filed on Mar. 14, 2014, now Pat. No. 10,799,725.

(60) Provisional application No. 61/800,473, filed on Mar. 15, 2013.

(51) Int. Cl.
| | | |
|---|---|---|
| *B64D 25/14* | (2006.01) | |
| *A62B 1/20* | (2006.01) | |
| *B65D 85/64* | (2006.01) | |

(52) U.S. Cl.
CPC .............. *A62B 1/20* (2013.01); *B64D 25/14* (2013.01); *B65D 85/64* (2013.01); *Y10T 29/4973* (2015.01)

(58) Field of Classification Search
CPC .......... A62B 1/20; B64D 25/14; B64D 85/64; Y10T 29/4973
See application file for complete search history.

(56) References Cited

U.S. PATENT DOCUMENTS

| | | |
|---|---|---|
| 3,266,655 A | 8/1966 | Trunk |
| 4,280,239 A | 7/1981 | Brown |
| 4,375,877 A | 3/1983 | Shorey |
| 4,385,415 A | 5/1983 | Volz |
| 4,534,445 A | 8/1985 | Fisher |
| 10,799,725 B2 | 10/2020 | Ordonez et al. |
| 2003/0171045 A1 | 9/2003 | Richard |

(Continued)

*Primary Examiner* — Nirvana Deonauth
(74) *Attorney, Agent, or Firm* — Tangent Law Group, PLLC; Eric J. Weierstall, Esq.

(57) ABSTRACT

Methods are disclosed for replacing expired or unserviceable aircraft emergency slides ("slides") in an aircraft. The disclosed methods utilize containers that are configured to securely retain both unserviceable slides and serviceable slides at different times in different configurations as installation tools. The container can be placed on an aircraft through the main door of the aircraft, and are further configured to be easily transported within the aircraft from a staging area of the aircraft to a slide installation and removal point at either the main door or an emergency exit door of the aircraft. The containers can be aligned with the installation and removal point to facilitate replacing an unserviceable slide with a new, serviceable slide. The disclosed methods and containers improve personnel safety concerning lifting and handling of the slides, which are heavy. The containers and methods disclosed herein further facilitate positioning of the slides near installation and removal points and properly orienting the slides, while reducing awkward handling situations for personnel.

7 Claims, 20 Drawing Sheets

(56) References Cited

U.S. PATENT DOCUMENTS

| | | |
|---|---|---|
| 2011/0147385 A1 | 6/2011 | Forrest |
| 2011/0168701 A1 | 7/2011 | Conen |
| 2011/0291607 A1 | 12/2011 | Rossi |
| 2013/0015639 A1 | 1/2013 | Bengtzen |
| 2013/0213737 A1 | 8/2013 | Bambrick et al. |
| 2014/0220184 A1 | 8/2014 | Boggs et al. |
| 2014/0262614 A1 | 9/2014 | Rushin et al. |
| 2015/0076021 A1 | 3/2015 | Ordonez et al. |

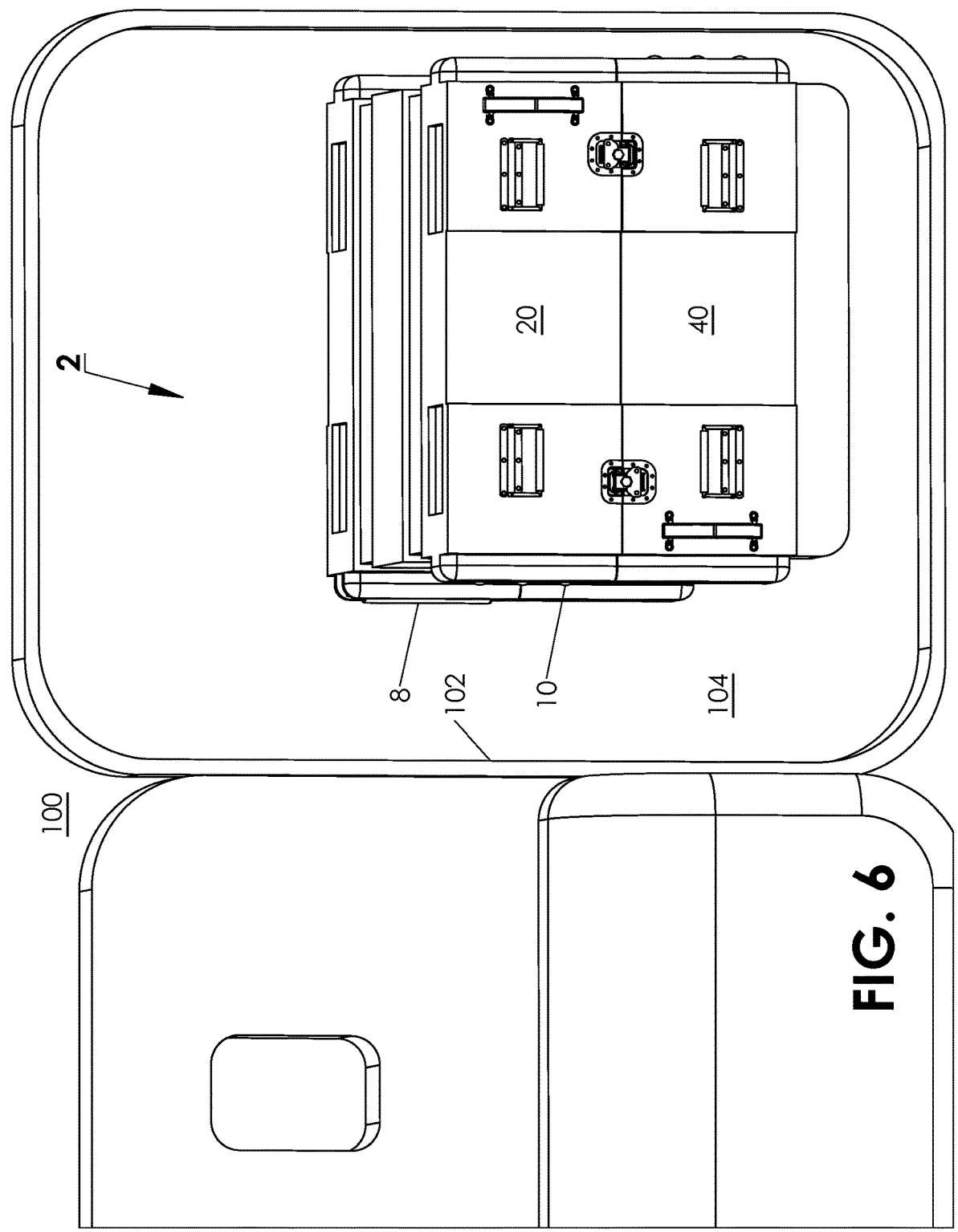

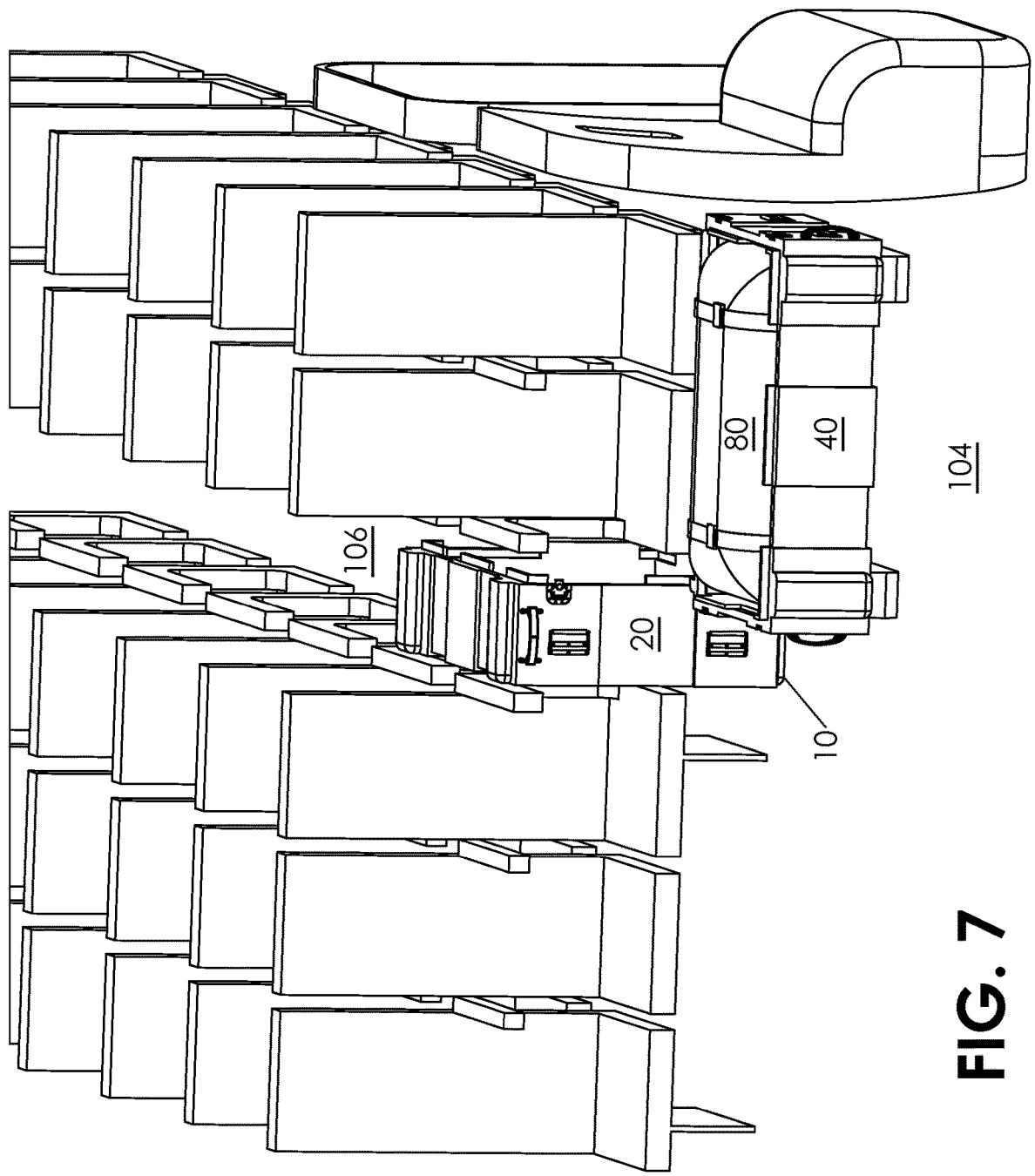

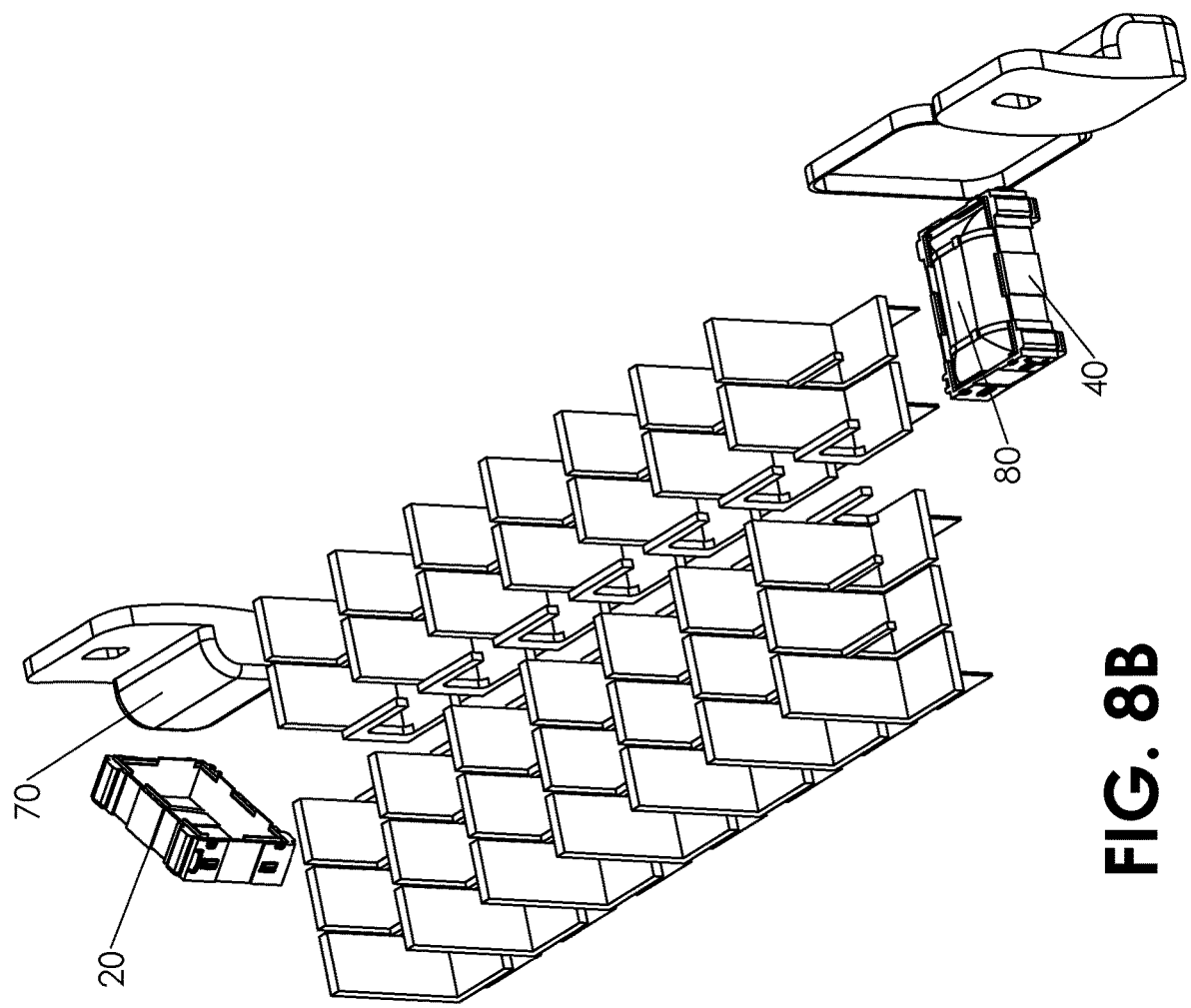

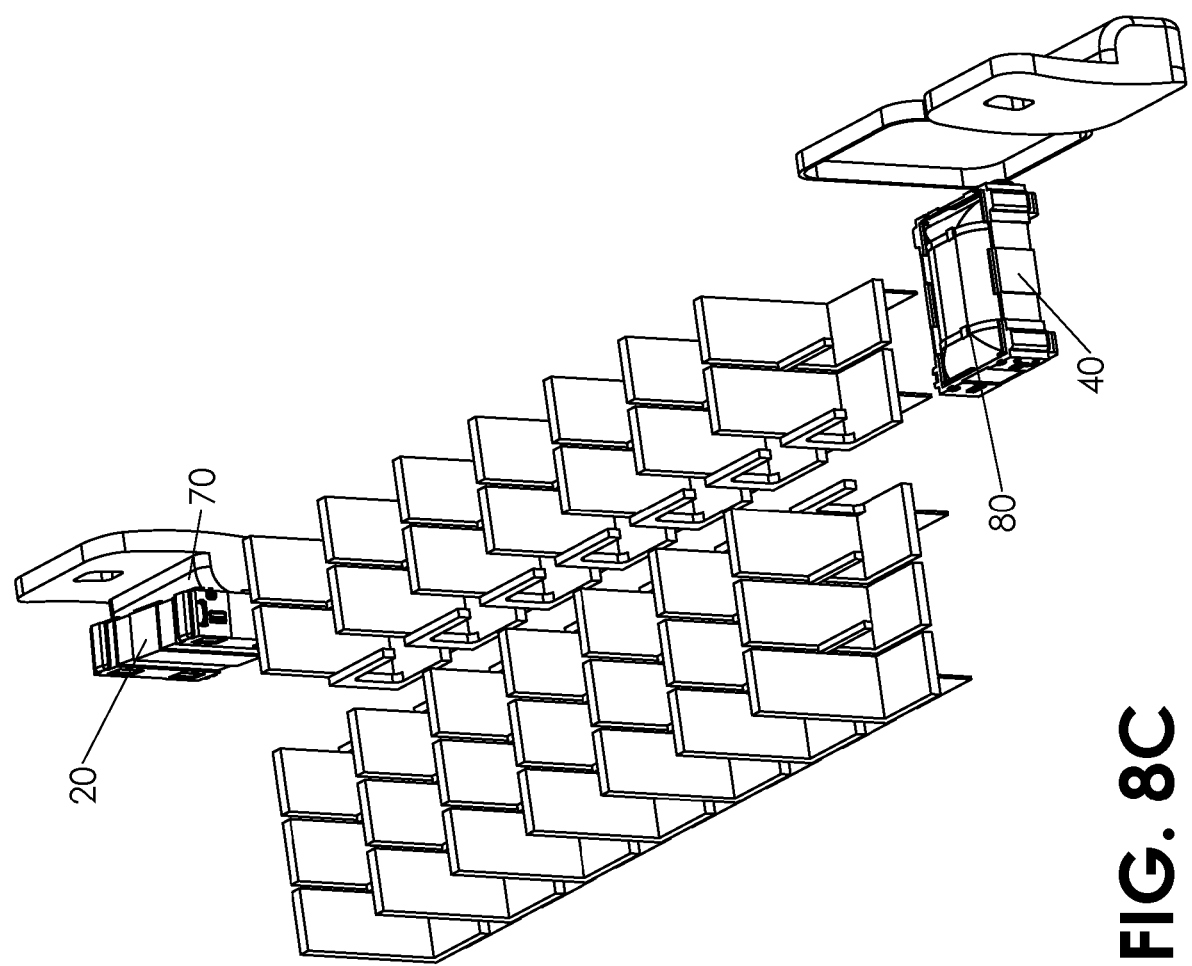

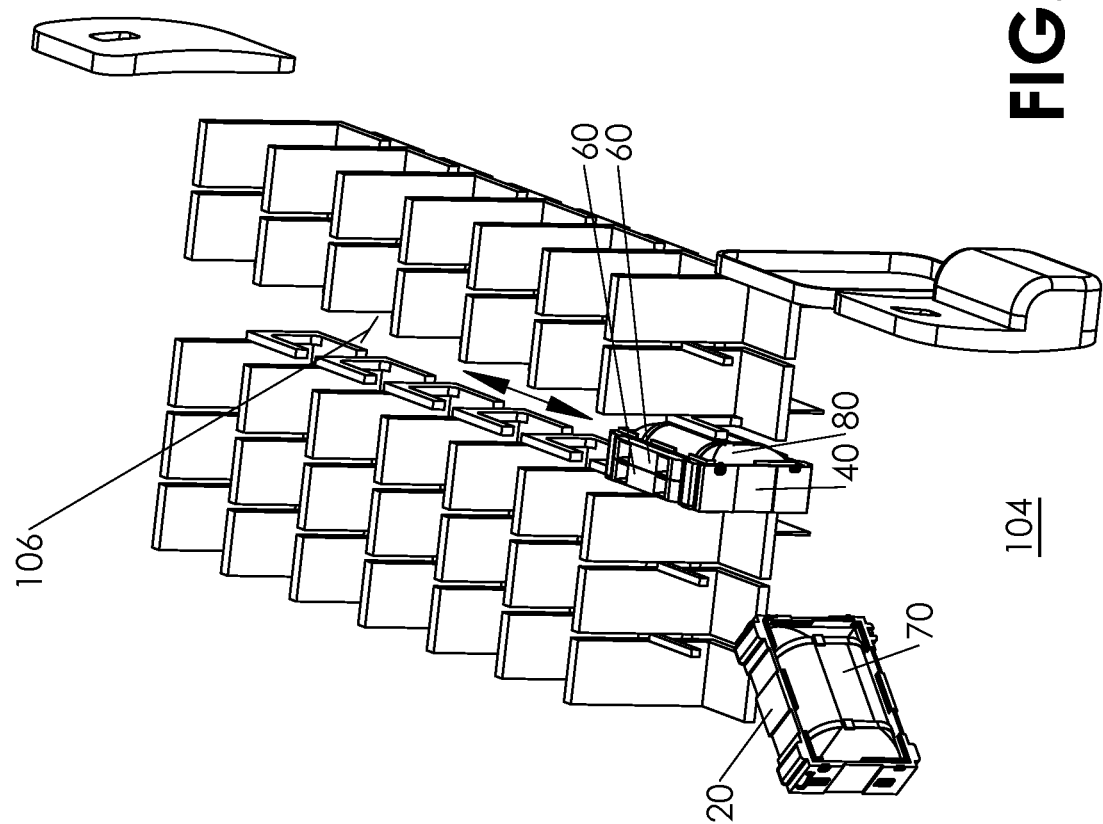

METHOD OF USING AN AIRCRAFT EMERGENCY SLIDE CONTAINER AS AN INSTALLATION TOOL FOR DEINSTALLATION AND INSTALLATION OF AIRCRAFT EMERGENCY SLIDES

BENEFIT OF PRIORITY

This application claims the priority of U.S. provisional patent application 61/800,473, filed Mar. 15, 2013 which is incorporated herein by reference and claims benefit of pre-AIA filing status and is a divisional of U.S. patent application Ser. No. 14/214,597 filed Mar. 14, 2014.

BACKGROUND OF THE INVENTION

Field of the Invention

The invention relates to aircraft emergency slide containers and methods of using such containers. More specifically, the invention relates to containers configured to secure and transport aircraft emergency slides, and methods of using the containers to secure aircraft emergency slides and position the slides at or near installation and removal points on an aircraft.

Background of the Invention

Aircraft emergency slides (hereinafter, "emergency slides" or "slides") are often installed in aircraft (e.g., airplanes) for deployment (e.g., by inflation) after emergency landings, crashes and/or other situations which require emergency evacuation of passengers. Un-deployed emergency slides installed in aircraft have a maximum permissible lifecycle (determined by the FAA or other regulatory agency, depending on jurisdiction) after which they are determined to be 'expired'/unserviceable and must be replaced. It is therefore important to provide devices and methods that facilitate replacement of emergency slides in an aircraft.

Emergency slides are typically installed in (or at/near) the main aircraft door used for passenger ingress and egress, and in (or at/near) one or more emergency exit doors located forward or aft of the main door and used only for passenger egress during emergency situations. Traditional devices and methods for replacing unserviceable slides are relatively simple, but are inefficient and dangerous, and risk damaging slides and parts of the aircraft.

According to traditional methods exchanging slides, the slides are transported to and from the aircraft in containers that are never placed inside the aircraft. New, serviceable slides are stored in containers having a base portion and a hinged lid attached to the base portion. When replacing an unserviceable slide located at the main aircraft door, a slide installer will typically access the main aircraft door from outside of the aircraft when the door is in an open position, then remove the expired slide and install a new slide in place of the expired slide. More specifically, when loading a new slide onto an aircraft, a container containing the new slide is typically lifted and tilted up, with the lid opened, and the slide is dumped out onto the aircraft, or onto the maintenance dock near the main door of the aircraft. Alternatively, the new slide can be manually lifted out of the container rather than dumped out of the container. The unserviceable slide is typically removed from its installation point and lifted into the container for removal from the aircraft. When lifting a slide out of or into a container, the slide has to be lifted vertically to a height equal that of the depth of the container (i.e., a person has to lift the slide up, over the side of the container, and out of the container). Whether dumping a new, serviceable slide out of a case, lifting a new, serviceable slide out of a container or lifting an unserviceable slide into a container, traditional devices and methods for replacing slides are dangerous and can potentially damage aircraft components and/or injure aircraft personnel if the slides are mishandled or dropped.

Traditional methods of exchanging slides at emergency exit doors are more problematic. More specifically, because emergency doors are typically not opened, a slide at an emergency door must be replaced when the emergency door is closed. Therefore, a new, serviceable slide, once removed from its case, must be dragged, slid or carried inside the aircraft (typically, down an aisle) from the main door to the installation point at the emergency door. An unserviceable slide must then be dragged, slid or carried inside the aircraft from the emergency door location to the main door, then removed through the main door and lifted into the container. Lifting, dragging and sliding of slides are concerns, because such handling of slides can result in injury to personnel as well as potential damage to slide material, aircraft carpet and seats.

It is therefore desirable to provide improved containers as tools and methods for securing and transporting aircraft emergency slides that address the above-described safety, damage and efficiency problems. It is further desirable to provide improved containers and methods for securing and transporting aircraft emergency slides that are simple and cost-effective.

SUMMARY OF THE INVENTION

It is an object of the invention to provide devices and methods that enhance personnel safety regarding lifting and handling of heavy aircraft emergency slides.

It is a further object of the invention to provide devices and methods that facilitate positioning of the slides near installation and removal points, orienting the slides properly, and preventing awkward handling situations.

It is a further object of the invention to provide devices and methods that can achieve the aforementioned objects in a cost-effective and efficient manner.

According to an embodiment, an aircraft emergency slide container includes a first container of an at least two body members configured to retain a serviceable aircraft emergency slide and a second of an at least two container body members. The container further includes at least one securement assembly configured to releasably attach the first container body member to the second container body member. Roller assemblies mounted on the first and second container body members enable translation and/or rotation of the first and second container body members. The second of the at least two body members can be configured to retain an unserviceable aircraft emergency slide, the first of the at least two body members retains a serviceable aircraft emergency slide to a service site and is separated from the second of the at least two body members, the second of the at least two body members is then moved to an installation point containing an unserviceable aircraft emergency slide and receives said unserviceable emergency slide.

An engagement device can be within the second of the at least two body members, wherein the second of the at least two body members configured to retain the unserviceable aircraft emergency slide is further engaged through the engagement device with the unserviceable slide to remove the slide. The engagement device can include a strap. An at least one mechanical leverage device can be included, wherein the mechanical leverage device assists in lifting the unserviceable slide. The at least one mechanical leverage device comprises an at least one cam, ratcheting advance, winch, lever and levered internal frame.

The translation assist assemblies can include at least one roller. The translation assist assemblies can include at least one omni-directional roller. The translation assist assemblies can include a rail or sliding element. The at least one securement assembly includes an at least one latch, snap, and buckle.

The aircraft emergency slide container can further comprise a serviceable emergency slide contained in the first of the at least two body members, wherein the serviceable emergency slide is brought in the container to a service site, is removed from the first container portion, the first of the at least two body members is moved empty to an installation site to remove an unserviceable emergency slide which is removed and put in the first of the at least two body members and removed to the service site and the serviceable aircraft emergency slide is then reinstalled in the first of the at least two body members then moved to the installation point containing the serviceable aircraft emergency slide and the serviceable emergency slide installed.

According to another embodiment, a method of replacing an unserviceable aircraft emergency slide is provided. According to the method, a container is moved through a main door of an aircraft to a staging area of the aircraft. The container can include a first of an at least two container body members releasably attached to a second container body member, and a serviceable aircraft emergency slide can be secured in the second container body member. The first container body member is detached from the second container body member, and the first container body member is moved near an installation point of the unserviceable aircraft emergency slide and aligned with the installation point. The unserviceable aircraft emergency slide is removed from the installation point and secured in the first container body member. The first container body member, including the unserviceable aircraft emergency slide, is then returned to the staging area. Next, the second container body member, including the serviceable aircraft emergency slide, is moved near the installation point and aligned with the installation point. The serviceable aircraft emergency slide is then installed at the installation point. Thereafter, the second container body member is returned to the staging area and attached to the first container body member to reform the container. After the container is reformed, the container is removed from the aircraft through the main door.

The removing of the unserviceable aircraft emergency slide from the installation point and securing the unserviceable aircraft emergency slide step can further comprise engaging an engagement device within the second of the at least two body members to retain the unserviceable aircraft emergency slide and remove the slide. The removing the unserviceable aircraft emergency slide from the installation point and securing the unserviceable aircraft emergency slide can further comprise engaging a mechanical leverage device to assists in lifting the unserviceable slide during removal.

According to an alternate method of replacing an unserviceable aircraft emergency slide, a container having a single body member is used. According to the alternate embodiment, the container, which is initially empty, can be moved through the main door of the aircraft to the staging area of the aircraft. Thereafter, the container can be moved near an installation point of the unserviceable aircraft emergency slide and aligned with the installation point. The unserviceable aircraft emergency slide can then be removed from the installation point and secured in the container. Next, the container, including the unserviceable aircraft emergency slide, can be returned to the staging area, and then moved off of the aircraft through the main door. The unserviceable aircraft emergency slide can then be removed from the container, and a serviceable aircraft emergency slide can be secured in the container. The container, including the serviceable aircraft emergency slide, can be returned to the staging area through the main door. From the staging area, the container, including the serviceable aircraft emergency slide, can be moved near the installation point and aligned with the installation point. The serviceable aircraft emergency slide can then be installed at the installation point, and the container can subsequently be removed from the aircraft through the main door.

The removing the unserviceable aircraft emergency slide from the installation point and securing the unserviceable aircraft emergency slide step can further comprise engaging an engagement device within the container to retain the unserviceable aircraft emergency slide and remove the slide. The removing the unserviceable aircraft emergency slide from the installation point and securing the unserviceable aircraft emergency slide can further comprise engaging a mechanical leverage device to assists in lifting the unserviceable slide during removal.

Moreover, the above objects, features and advantages of the invention are illustrative, and not exhaustive, of those that can be achieved by the invention. Thus, these and other objects, features and advantages of the invention will be apparent from the description herein and appended drawings, both as embodied herein and as modified in view of any variations that will be apparent to those skilled in the art.

BRIEF DESCRIPTION OF THE DRAWINGS

FIG. 6 illustrates the first portion of the container in a staging area near a main door of an aircraft.

FIG. 7 shows the first portion of the container in a main isle of the aircraft.

FIG. 8A-8M illustratively shows an exemplary embodiment of a method of changing a slide using the invention.

DETAILED DESCRIPTION OF THE INVENTION

Referring to the appended drawing FIGS. 1-5, in which like numerals refer to like elements throughout the several views, the disclosure concerns aircraft emergency slide containers and methods of exchanging aircraft emergency slides (or chutes) on an aircraft using such containers. It is noted that the aircraft emergency slides disclosed herein can be inflatable, expandable members constructed of a flexible material. When undeployed (either secured in a container or installed at an aircraft door), the slides are typically stored in a compacted, folded configuration. When deployed during an emergency situation, the slides are inflated and expand to provide an exit path from the aircraft.

Throughout the description, reference is made to various directions and locations, such as "bottom", "top", "end", "side", "inner" and "outer", for example. It should be understood that these terms are used to reference relative directions and locations, merely to facilitate understanding of the devices and methods as shown in the appended drawings, and are not intended to be limiting.

Figure 1:
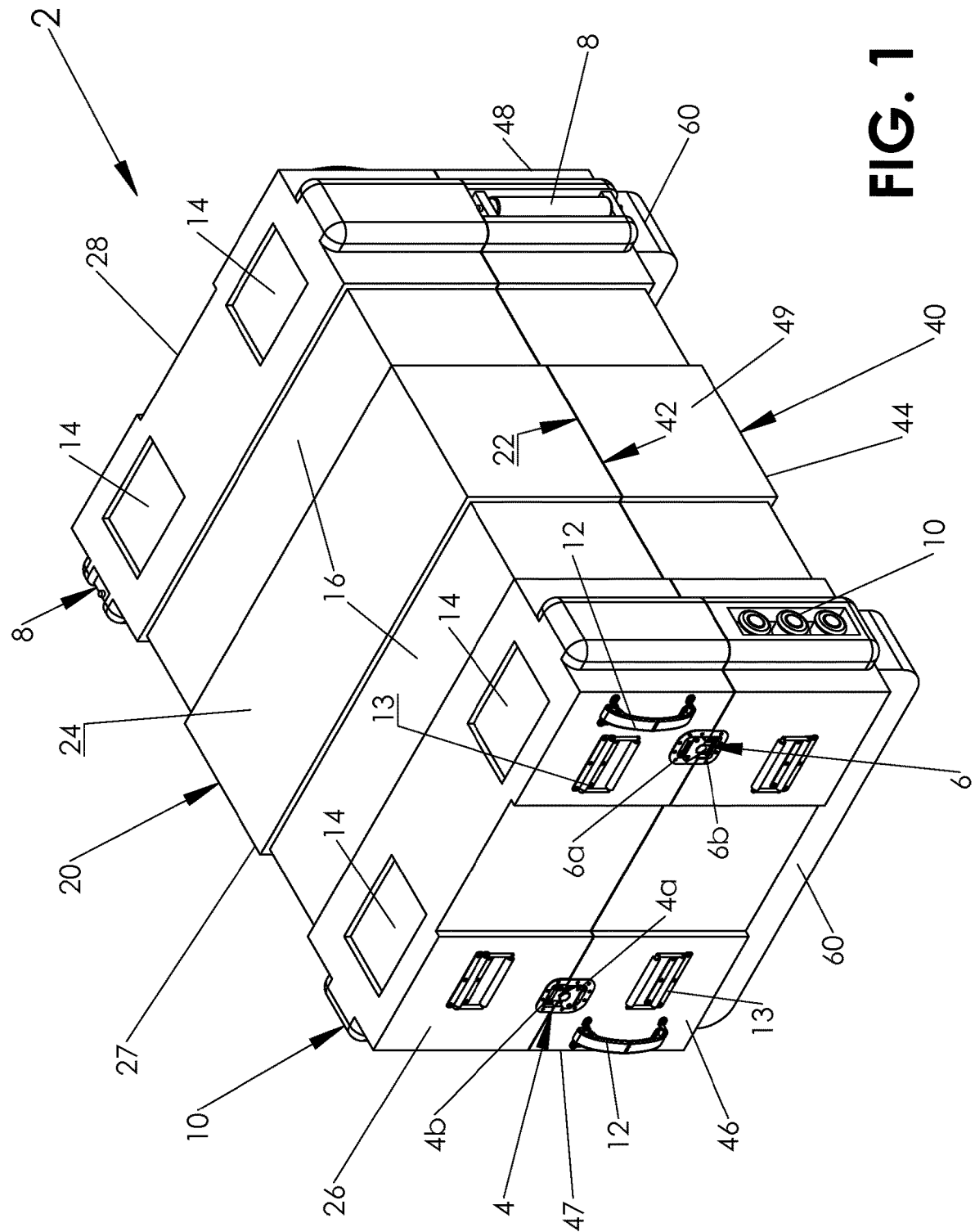
FIG. 1 is a perspective view of an exemplary embodiment of an aircraft emergency slide container having first and second portions assembled in a shipping configuration.

An aircraft emergency slide container 2 according to an exemplary embodiment of the invention is shown in FIG. 1. As illustrated in FIG. 1, the container 2 includes an at least one container portion or body member, shown in the exemplary embodiment as a first container portion 20 and a second container portion or body member 40 releasably attached to each other by one or more securement assemblies 4, 6. The first and second portions can be substantially similar in shape and construction and can be attached to each other at their open inner faces 22, 42 to create an open interior volume (not shown) for containing an aircraft emergency slide. Each container portion 20, 40 can essentially constitute a "half" of the container 2.

Although in the exemplary embodiments shown herein the at least two container portions 20, 40 are part of a single container, the container portions may also be two containers, such a solution being well within the spirit of the invention. Additionally, the container portions 20, 40 are shown to have substantially rectangular box shapes, thereby providing the container 2 in the form of a rectangular box, other shapes are possible for the first and second container portions 20, 40 and the container 2 to accommodate different shapes in the replacement emergency slides. The securement assemblies 4, 6 can be any suitable types of locking latch assemblies or detent assemblies, for example. According to the exemplary embodiment shown, the securement assemblies 4, 6 include arm members or levers 4a, 6a configured to engage respective catch members 4b, 6b in a locking manner. In the embodiment shown in FIGS. 1-5, levers 6a and catch members 4b are attached to the first container portion 20, and levers 4a and catch members 6b are attached to the second container portion 40. However, it should be understood that other arrangements of the levers 4a, 6a and catch members 4b, 6b are possible.

Figure 2:
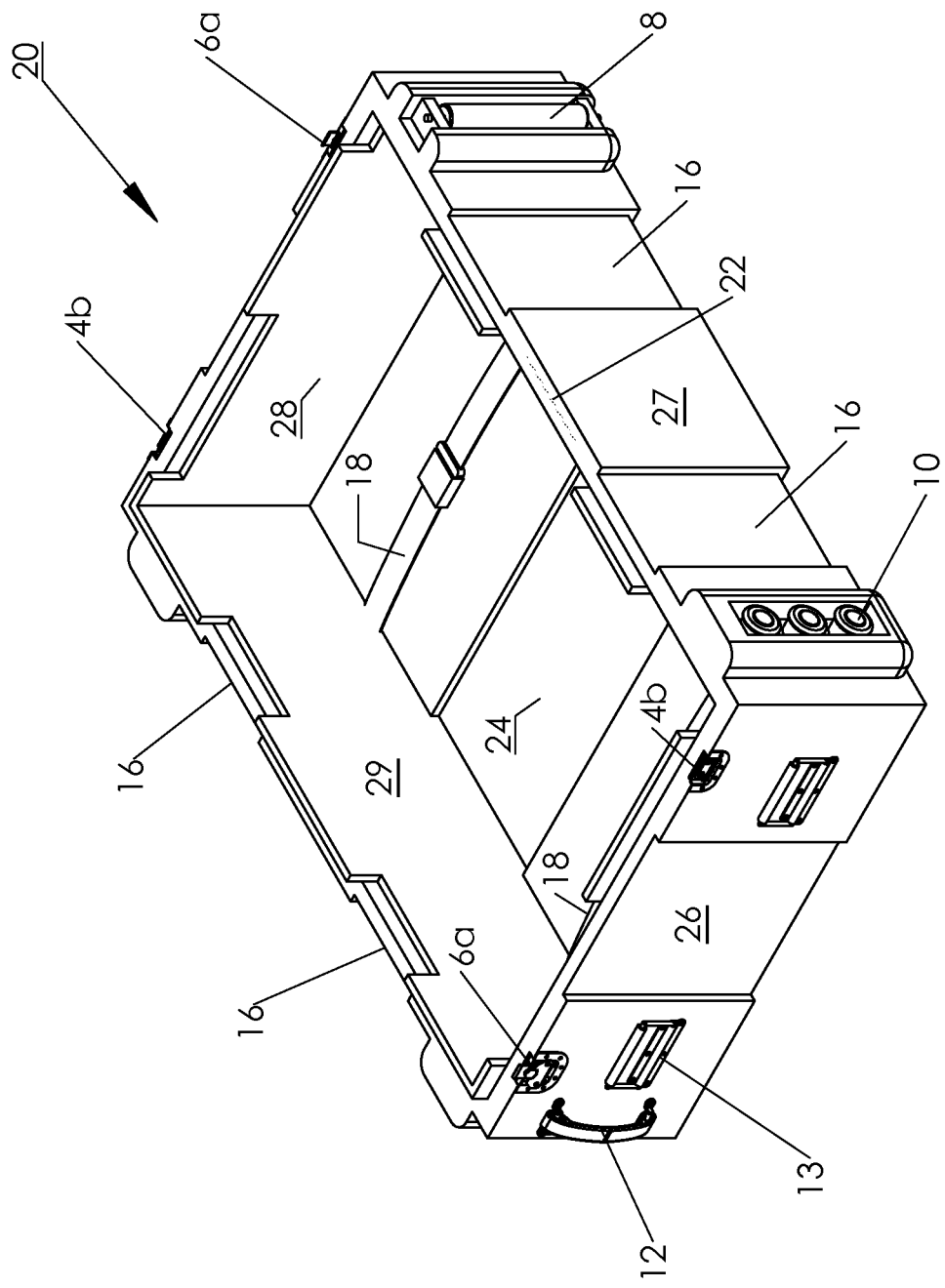
FIG. 2 is a perspective view of the first portion of an exemplary embodiment of a container, detached from the second portion of the container.
Figure 4:
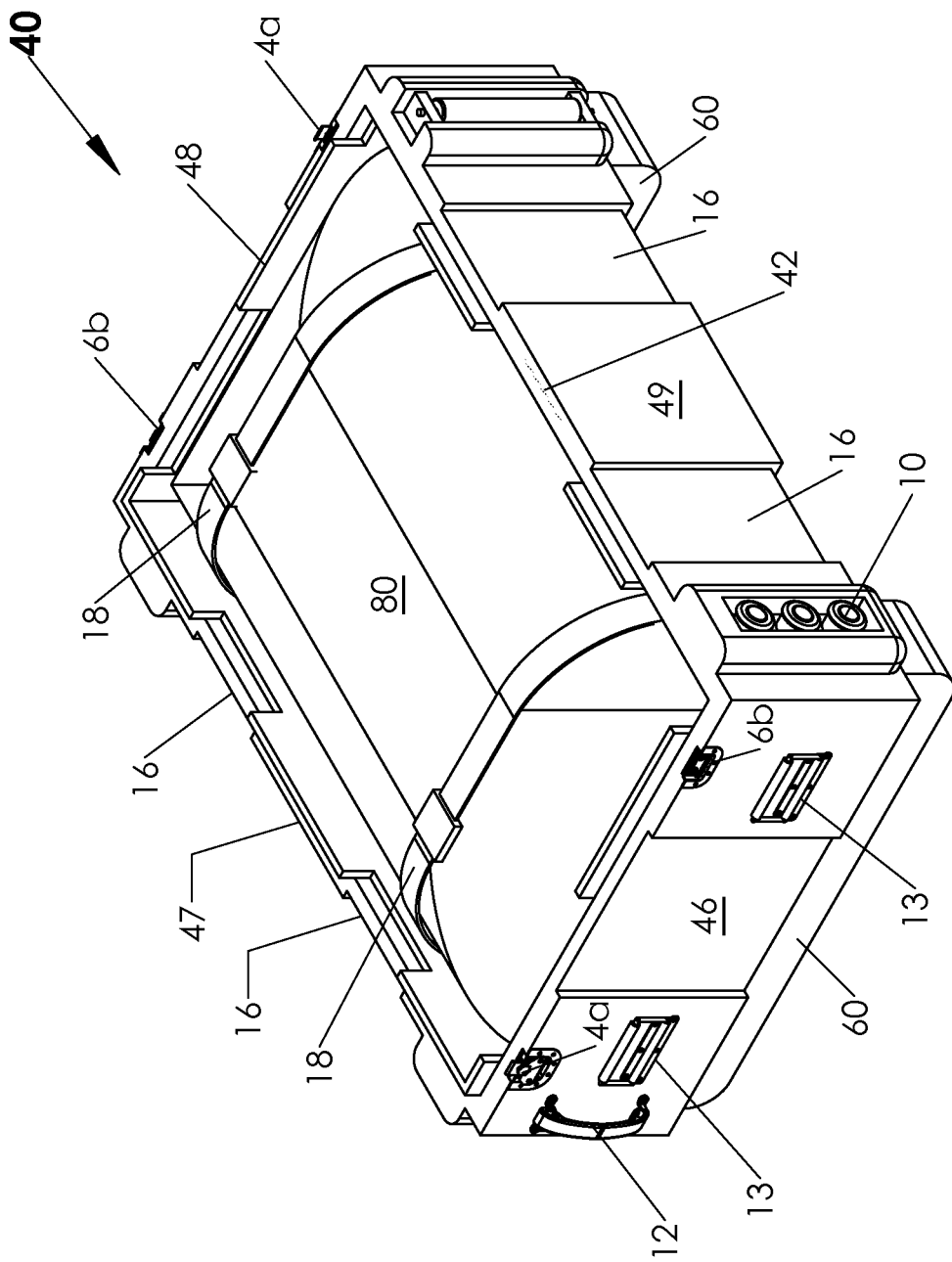
FIG. 4 is a perspective view of the second portion of the container, detached from the first portion of the container and containing a new, serviceable aircraft emergency slide.
Figure 5:
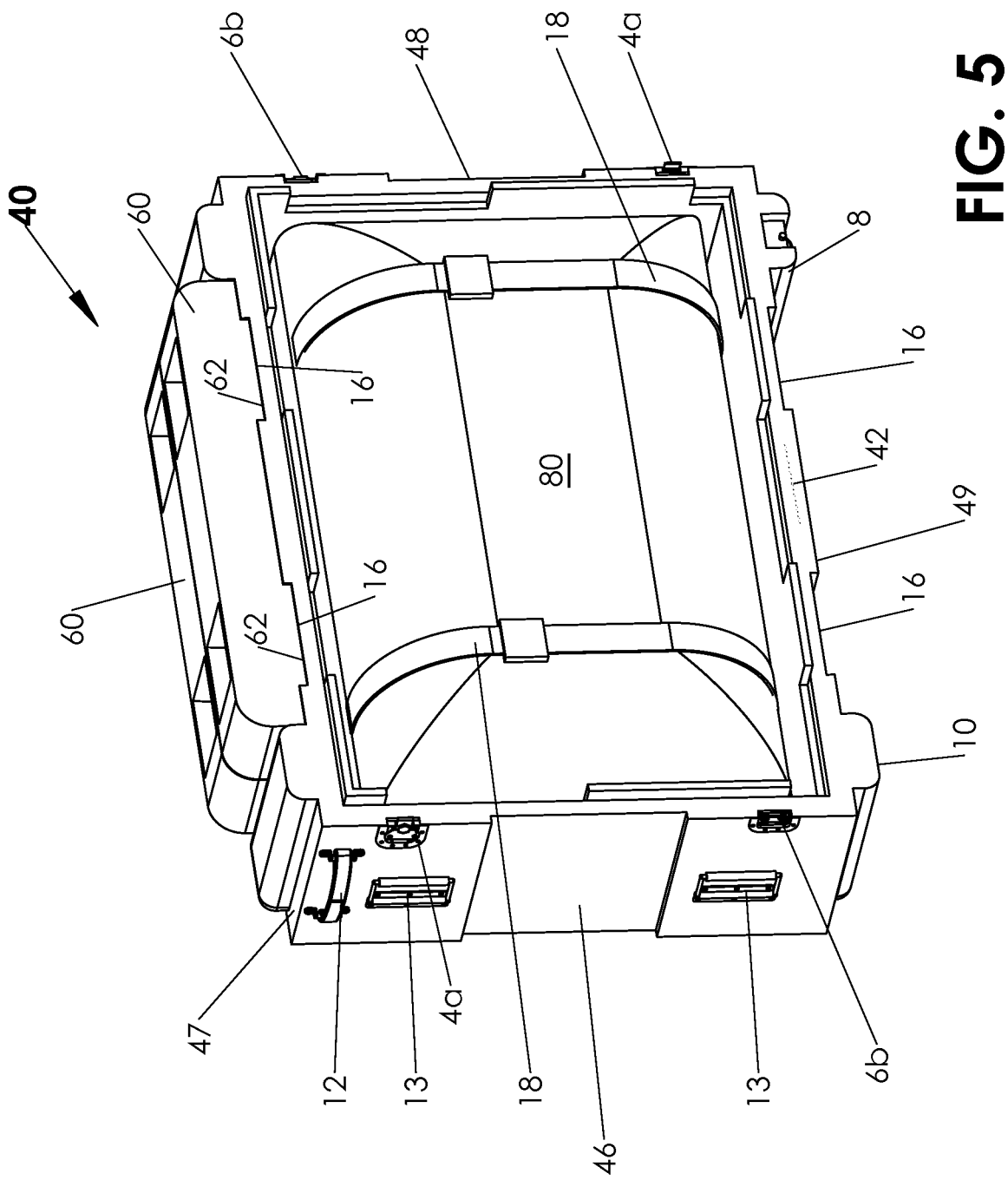
FIG. 5 is a perspective view of the second portion of the container, detached from the first portion of the container and configured in a transport configuration.

Referencing FIGS. 1 and 2, the first container portion 20 includes a main panel 24, opposing end panels 26, 28 and opposing side panels 27, 29. Similarly, as shown in FIGS. 1, 4 and 5, the second container portion 40 includes a main panel 44, opposing end panels 46, 48 and opposing side panels 47, 49. Referencing FIGS. 1-5, to enable the container portions 20, 40 to roll on a ground surface, translation assist or roller assemblies 8, 10 are mounted on the side panels 27, 49. In the illustrated embodiment, roller assemblies 8 include a cylindrical, bi-directional rolling element and roller assemblies 10 include spherical, omni-directional rolling elements. Alternatively these may comprise sliding elements as well or other elements to facilitate easier movement as may be needed. Each panel 27,49 is shown having one of each roller assembly 8, 10, thereby allowing the container portions 20, 40 to pivot at one end as well as translate on a ground surface. It should be understood, however, that different numbers, types, combinations and arrangements of roller assemblies can be provided on the container portions 20, 40.

As shown in FIGS. 1, 2, 4 and 5, hand grips or handles 12 can be attached to the end panels 26, 46. The handles 12 can be grasped by a person to facilitate pulling or pushing the container portions 20, 40 along a ground surface. Additional handles 13 in the end panels 26, 28, 46, 48 (handles 13 in panels 46, 48 are not visible in the views) can facilitate lifting and carrying of the container portions 20, 40. Although a single handle 12 and two handles 13 are shown on each end panel 26, 46, it should be understood that other handles can be included at various locations on the container portions 20,40 in addition to or in place of the handles 12, 13.

Referring to FIG. 1, recesses 14 are formed in the main panels 24, 44 (recesses 14 in the main panel 44 are hidden from view). A pair of recessed channels 16 are formed in each container portion 20, 40. The recessed channels 16 extend from the respective side panel 27, 47 to the respective main panel 24, 44 and from the respective main panel 24, 44 to the respective side panel 29, 49.

Turning to FIGS. 2,4 and 5, the container portions 20, 40 can each include at least one slide retention members 18 configured to securely hold an aircraft emergency slide within the respective container portion 20, 40. The slide retention members 18 can be for example, but are certainly not limited to, adjustable straps or elastic straps anchored to the respective main panel 24, 44 or the respective side panels 27, 29 and 47,49. According to an embodiment, as shown in FIG. 4, the second container portion 40 can contain a new, serviceable slide 80 secured in place under the retention members 18. Although the illustrated embodiment depicts two retention members 18, it should be understood that fewer or more retention members 18 can be used, and that other types of retention members are possible. Specifically, alternate embodiments using a single retention member and making multiple trips to uninstall an expired emergency slide and install a new emergency slide as well as a container for multiple retention members with new emergency slides for all doors on an aircraft are considered but not shown herein in separate Figures.

In FIG. 1, the container 2 is shown in a shipping configuration, which is used to store a slide during shipping of the slide to a destination. As illustrated in FIG. 1, in the shipping configuration, the container 2 is oriented such that the main panel 24 of the first container portion 20 forms a top surface of the container 2 and the main panel 44 of the second container portion 40 forms a bottom surface of the container 2. A pair of skids 60 can be attached to the main panel 44 such that legs 62 (see FIG. 5) of the skids 60 are engaged and retained (e.g., via interference fit or snap-in fit) by the recesses 14. Optionally, further securing means, such as fasteners, can be used to secure the skids 60 to the panel 44. The skids 60 support the container portion 40 on a ground service in a stable manner to prevent or limit movement of the container 2 during shipping. When the container 2 is being used to exchange slides on an aircraft, the skids 60 can be removed from the main panel 44 and secured to the side wall 29 or the side wall 47 of respective container portions 20, 40 by engaging the legs 62 of the skids 60 with the recessed channels 16 (see FIG. 5). Optionally, further securing means, such as fasteners, can be used to secure the skids 60 to the wall 29 or 47.

Exemplary methods for using the container 2 to exchange aircraft emergency slides in an aircraft will now be described with reference to FIGS. 1-7 and an exemplary embodiment is shown in FIGS. 8A-8F. The exemplary methods disclosed herein are particularly beneficial for exchanging emergency slides positioned at emergency doors of aircraft, but are also beneficial for exchanging emergency slides positioned at main doors of aircraft. It should be understood that variations of and additions to the described procedures, chronological rearrangement of the described procedures, and elimination of certain procedures may be possible depending on the configuration of the aircraft being serviced and the configuration and construction of the installation points for the emergency slide(s) on the aircraft, among other factors.

According to an embodiment, in order to replace an unserviceable emergency slide 70 (FIG. 3) on an aircraft 100 (FIG. 6), the container 2, which can contain a new, serviceable emergency slide 80 (FIG. 4) can first be brought through the main door 102 (FIG. 6) of the aircraft 100 to the staging area 104 (e.g., just inside the main aircraft door 102, behind the cockpit (not shown)) of the aircraft and placed on the floor in the position illustrated in FIG. 1, resting on the skids 60. Once the container 2 is positioned in the staging area 104, the first and second container portions 20, 40 can be detached from each other by releasing the securement assemblies 4, 6 (e.g., by disengaging the levers 4a, 6a from respective catch members 4b, 6b) and then lifting the first container portion 20 off of the second container portion 40. FIG. 2 is a detailed view of the first container portion 20 detached from the second container portion.

According to an alternative embodiment, the skids 60 could be mounted on the first container portion 20 and the container 2 could be positioned with the first container portion 20 as the bottom of the container 2, resting on the skids 60. In this alternate configuration, the container portions 20, 40 could be detached by lifting the second container portion 40 off of the first container portion 20. However, such a configuration is more difficult to manage, as it would require lifting the second container portion 40, which is heavier than the first container portion 20 because the second container portion 40 contains the new, serviceable slide 80.

As shown in FIG. 6, once separated from the second container portion 40, the first container portion 20 can be placed in an upright position resting on the roller assemblies 8, 10, and rolled to the door at which the unserviceable emergency slide 70 is installed (referred to hereafter as the "installation door"). If the installation door is an emergency door (not shown), the first container portion 20 can be rolled down the center isle 106 (FIG. 7) of the aircraft and positioned near the emergency door. If the installation door is the main door 102, the first container portion 20 can simply be placed in the upright position and maneuvered into a position near the main aircraft door 102.

Figure 3:
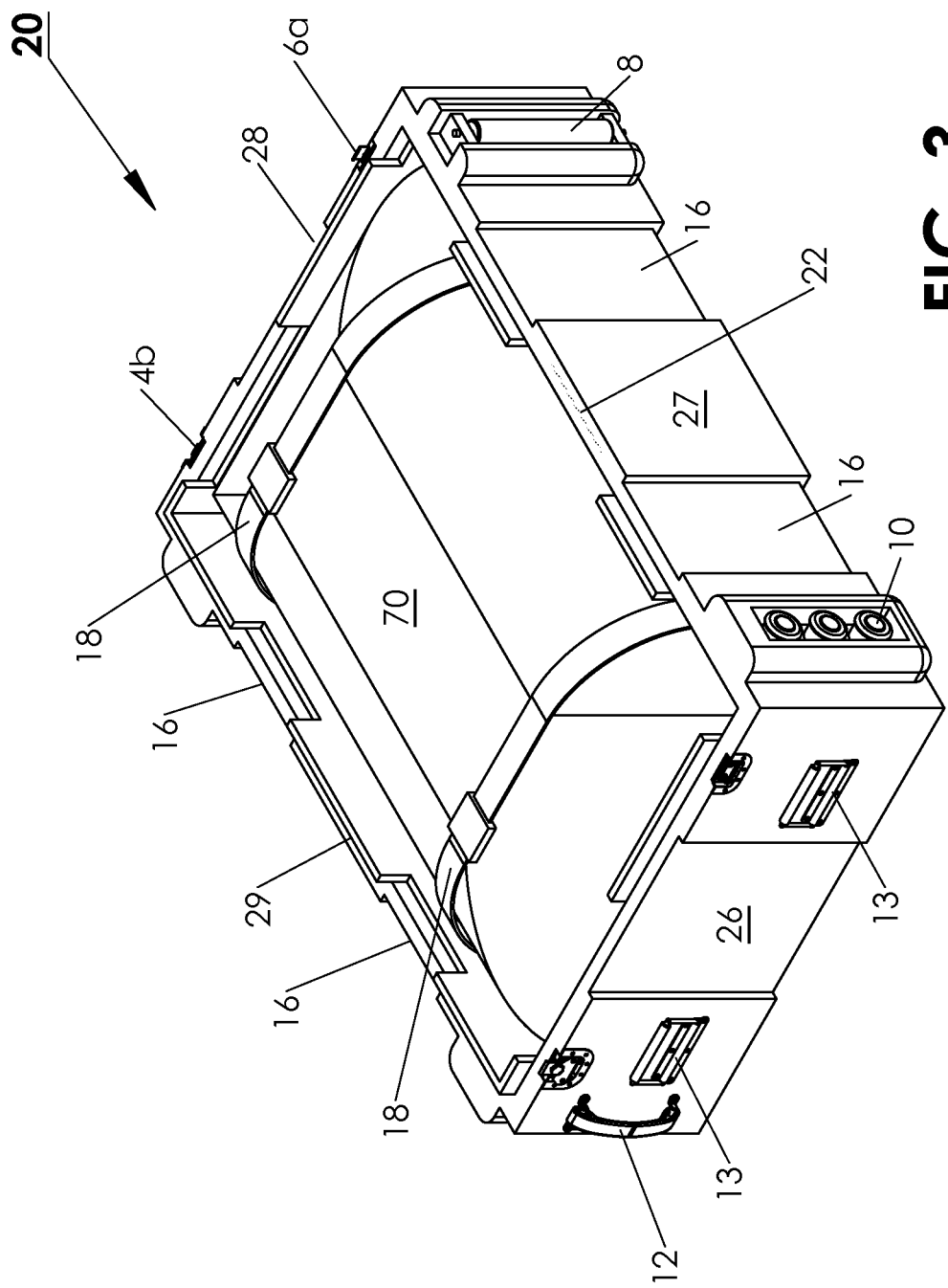
FIG. 3 shows the first portion of the container with an unserviceable aircraft emergency slide secured therein.

Referring to FIG. 3, once the first container portion 20 is positioned near the installation door and oriented in a desired alignment with the installation point, the unserviceable emergency slide 70 can be removed from its installation location and placed in the first container portion 20. Preferably, to minimize lifting of the slide 70, the slide 70 is positioned in the first container portion 20 while the first container portion 20 is resting on its roller assemblies 8, 10 in the upright position. Once the slide 70 is placed in the first container portion 20, the slide 70 can be secured in the first container portion 20 under the retention members 18, which can be adjusted as required to tightly retain the slide 70. After the slide 70 is secured in the first container portion 20, the first container portion 20 can be rolled from the installation door back to the staging area.

Turning now to FIG. 4, upon returning the first container portion 20 to the staging area 104, the second container portion 40, still detached from the first container portion 20, can be used to transport the new, serviceable emergency slide 80 to the installation door. The second container portion 40 is shown detached from the first container portion 20 and holding the slide 80 in FIGS. 4 and 5. As shown in FIG. 5, the second container portion 40 can be positioned in an upright position resting on its roller assemblies 8, 10 and placed in a transport configuration by detaching the skids 60 from the main panel 44 and attaching the skids 60 to the end panel 47, now positioned at the top of the second container portion 40. The skids 60 can be secured to the end panel 47 by engagement (e.g., by an interference or snap-in fit) of the feet 62 with the recessed channels 16. Optionally, the skids 60 can be further secured to the end panel 47 with additional fastening means (not shown). The transport configuration of the second container portion 40 reduces the width of the second container portion 40 in its upright configuration, providing more clearance in the isle 106 (FIG. 7).

If the installation door is an emergency door (not shown), the second container portion 40 can be rolled down the center isle 106 (FIG. 7) of the aircraft 100 and positioned near the emergency door. If the installation door is the main door 102 (FIG. 6), the second container portion 40 can simply be placed in the upright position and maneuvered into a position in near the main aircraft door 102.

Once the second container portion 40 is positioned near the installation door and placed in desired alignment with the installation point, the retention members 18 can be loosened, and the slide 80 can be removed from the second container portion 40, preferably while the second container portion 40 is still in its upright position, and installed at the installation point. Further modifications of the container portions 20, 40 to be levered or components of the container portions 20, 40 to be lowered to and assist in lifting the new slide 80 or the unserviceable emergency slide 70. Some non-limiting examples of a mechanical leverage devices include, but are certainly not limited to, a simple cam, ratcheting advance, or winch or levering or levered internal frame or similar mechanism, which though not shown, may be included to assist in lifting the new slide 80 or the unserviceable emergency slide 70 and may also include an engagement device, such as a strap, belt or similar device to assist in engaging the unserviceable slide as well as work in conjunction with the mechanical leverage devices.

Once the new, serviceable slide 80 is installed, the second container portion 40 can be rolled back to the staging area 104 (FIG. 6) and reattached to the first container portion 20 by fastening/locking the securement assemblies 4, 6. Thereafter, the reassembled container 2, which now contains the unserviceable slide 70, can be removed through the main door 102 and placed in the shipping configuration illustrated in FIG. 1 (with the skids 60 attached to the main panel 44) in preparation for shipping.

According to further embodiments, a retractable or foldable kickstand (not shown) can be provided on the container portions 20, 40 to stabilize the container portions 20, 40 during the loading and unloading of slides 70, 80.

Although the disclosed embodiments concern a container that can be divided into two separate portions for replacing an unserviceable slide with a serviceable slide, it is envisioned that a single-bodied container could be used to both remove an 14 unserviceable slide and install a serviceable slide. For example, one of the container portions 20, 40 could form a complete container, and could be used to both deliver a serviceable slide to an installation point and remove an unserviceable slide from the installation point using similar method steps. Additionally, although the disclosed embodiments include container portions that enclose emergency slides, it is envisioned that a container or tool for exchanging slides can include one or more portions that engage and retain slides in different manners.

Figure 8A:
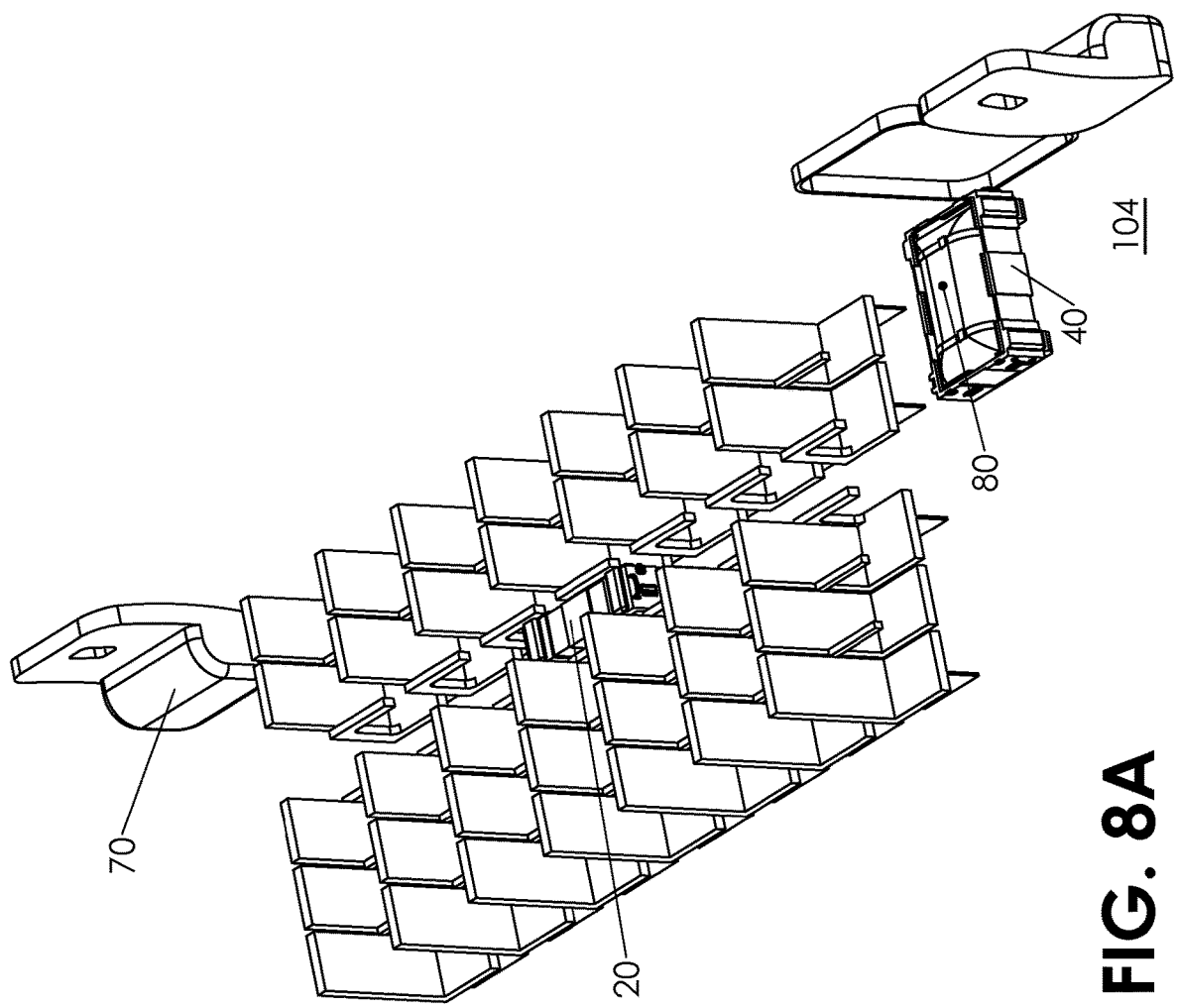
Figure 8D:
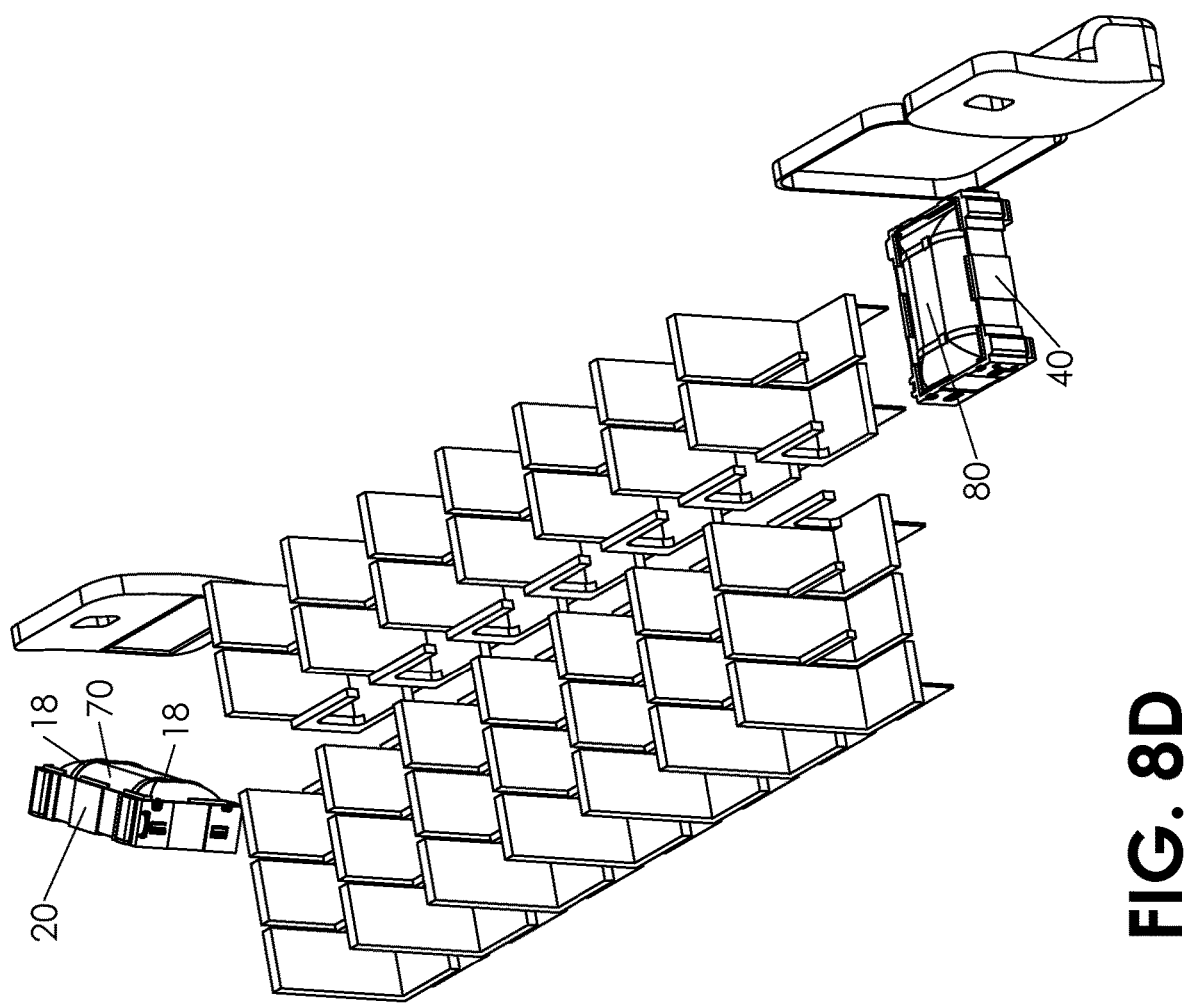

FIGS. 8A-8M show an exemplary embodiment of a method of using an exemplary embodiment of the invention. The following is a description of the exemplary method for replacing an unserviceable slide using a single-bodied container shown in FIGS. 8A-8M. First, the container, which is initially empty or can be coupled to a portion having a new, serviceable slide contained therein as described above, can be moved through the main door of the aircraft to the staging area of the aircraft as shown in FIG. 8A. In the case of a container having a container portion with a new serviceable slide, the new, serviceable slide container portion can be retained in the service area as shown. Thereafter, the empty container or container portion can be moved near an installation point of the unserviceable aircraft emergency slide and aligned with the installation point as seen in FIG. 8B. The unserviceable aircraft emergency slide can then be removed from the installation point and secured in the container, as see in FIG. 8C-8E. Next, the container or container portion, including the unserviceable aircraft emergency slide, can be returned to the staging area, and then moved off of the aircraft through the main door in the case of the originally empty container. In that case, the unserviceable aircraft emergency slide can then be removed from the container and a serviceable aircraft emergency slide can be secured in the container. The container, including the serviceable aircraft emergency slide, can be returned to the staging area through the main door. In this case, the half with the non-serviceable slide can be left in the staging area and once the portion with the unserviceable slide is moved to the staging area the new, serviceable slide in the container portion is ready to be moved as seen in FIG. 8E.

Figure 8E:
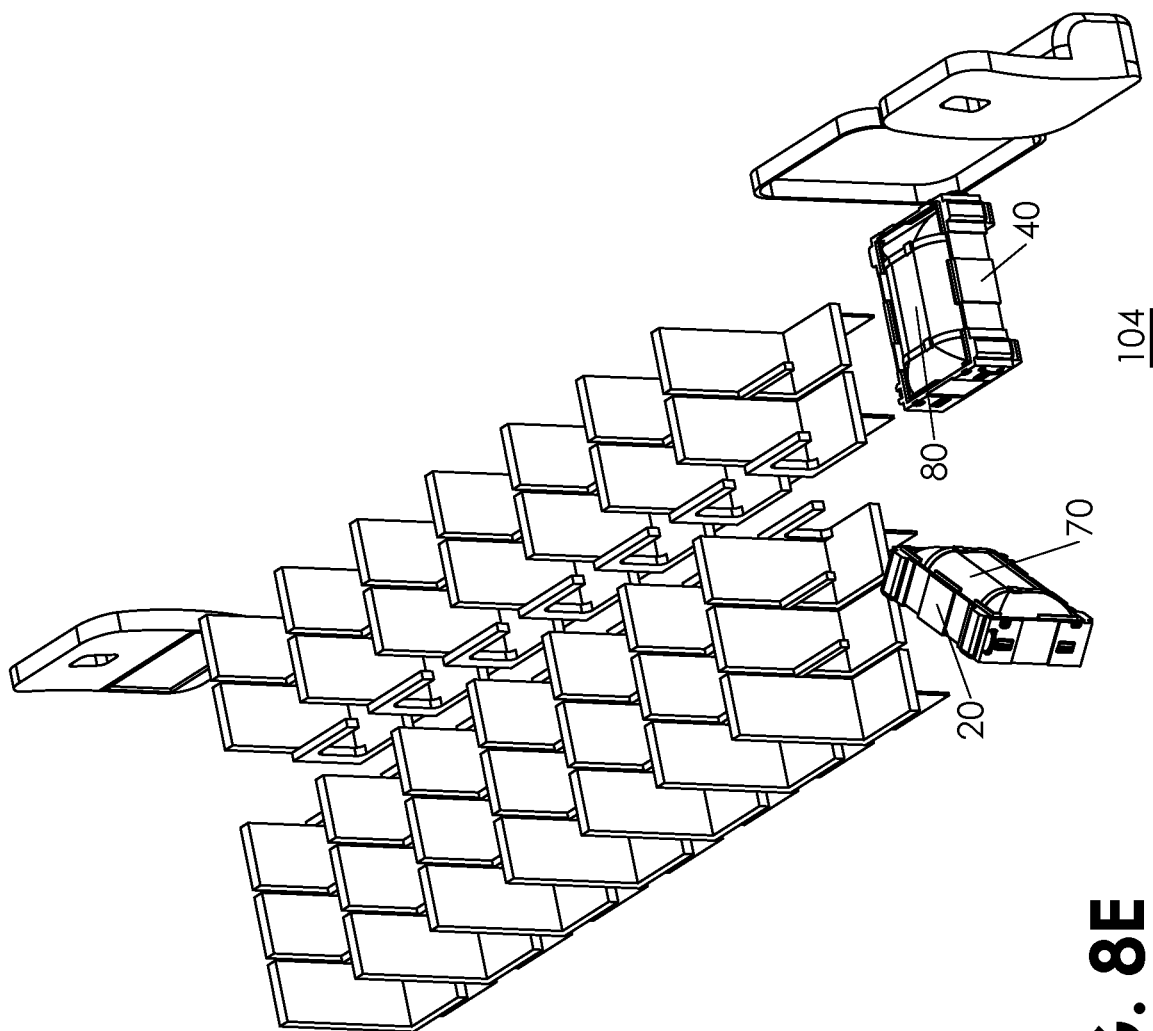
Figure 8G:
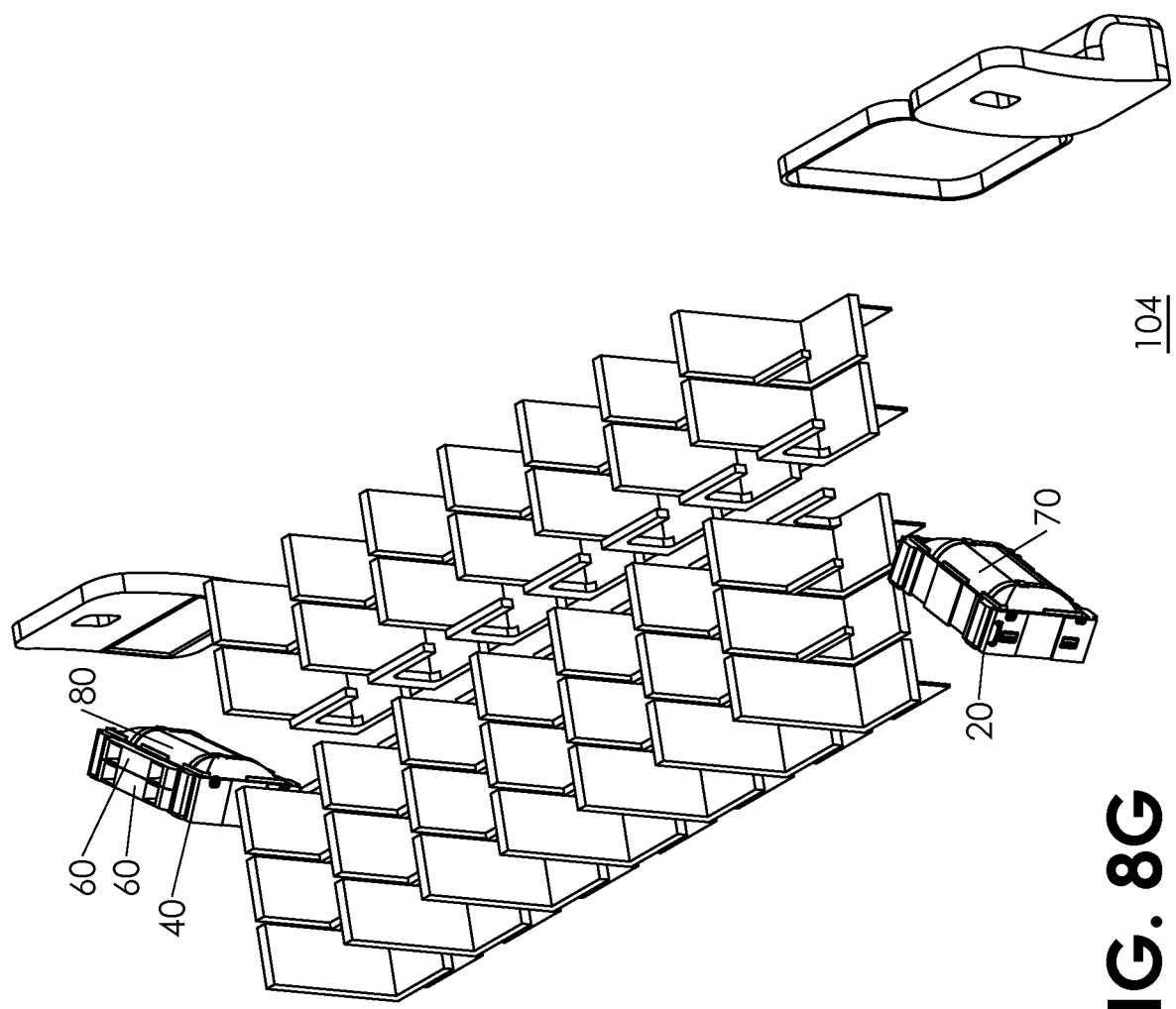
Figure 8H:
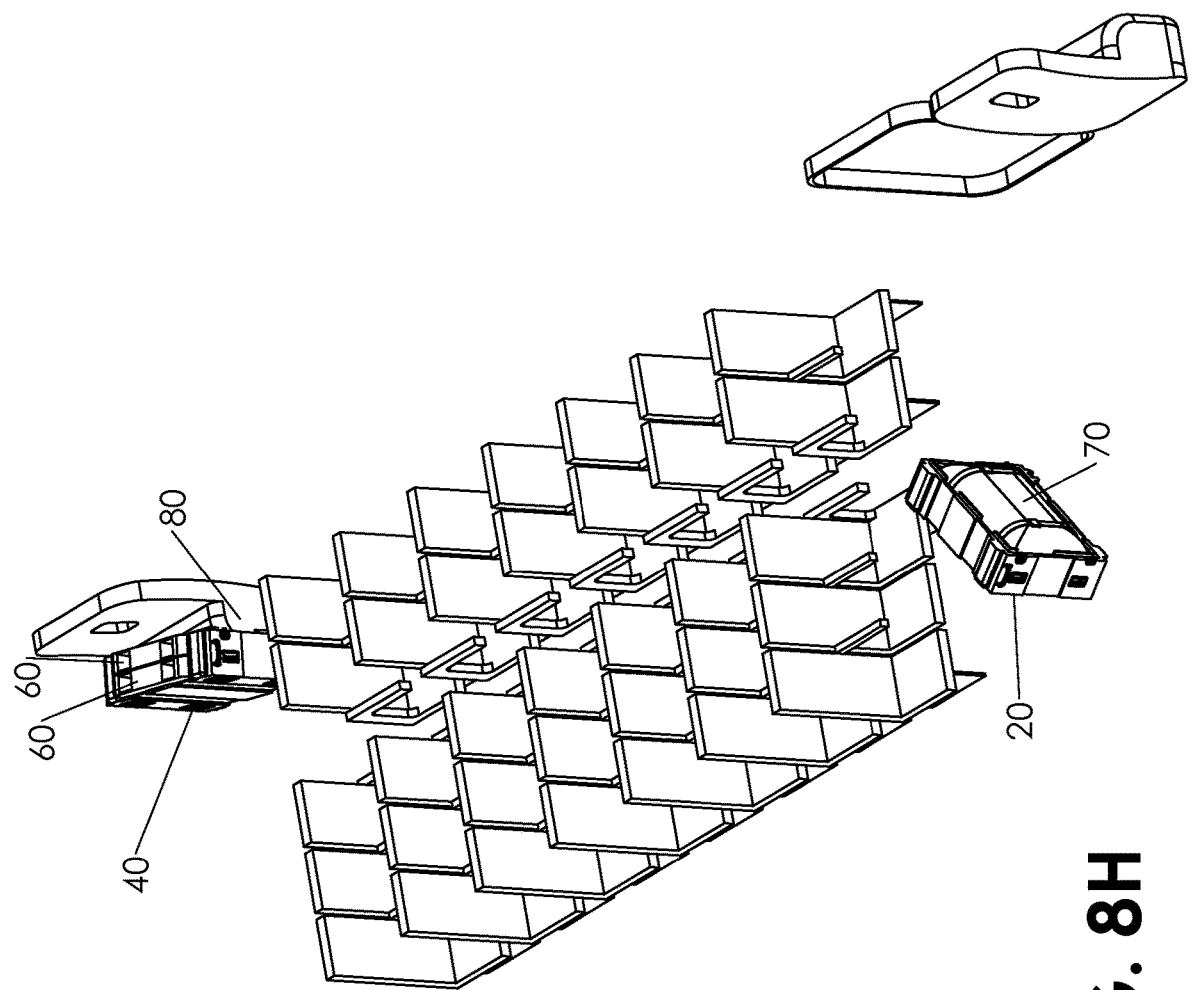
Figure 8I:
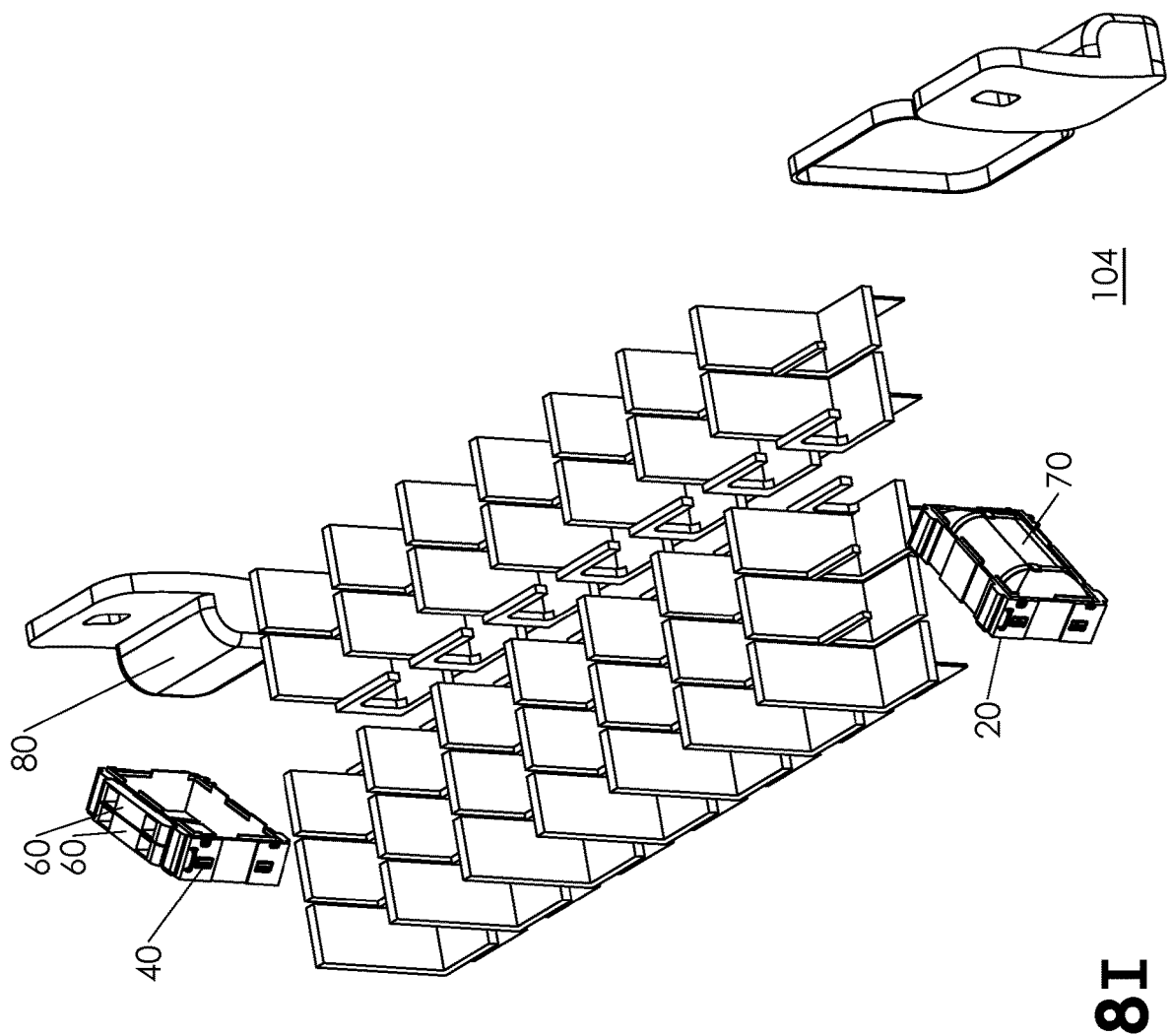
Figure 8J:
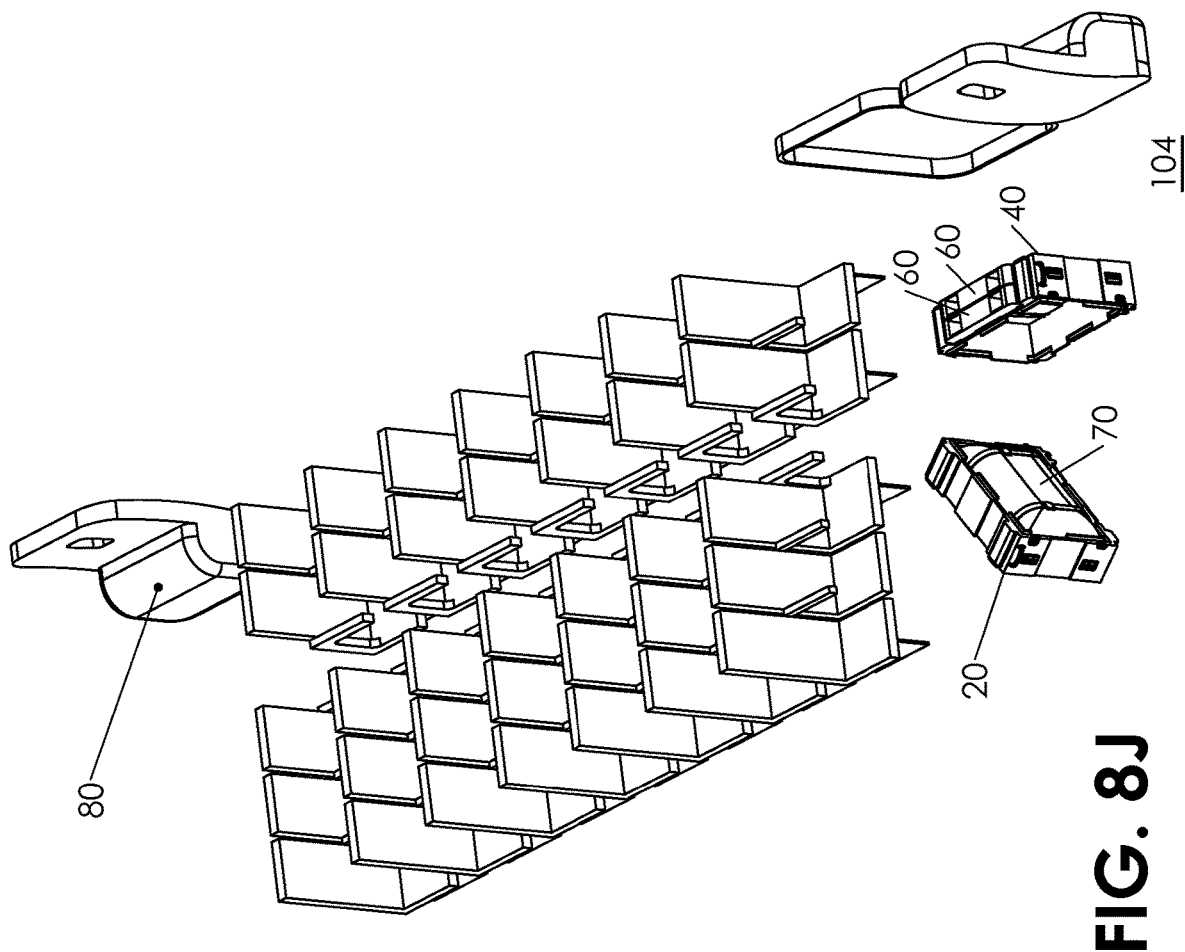
Figure 8K:
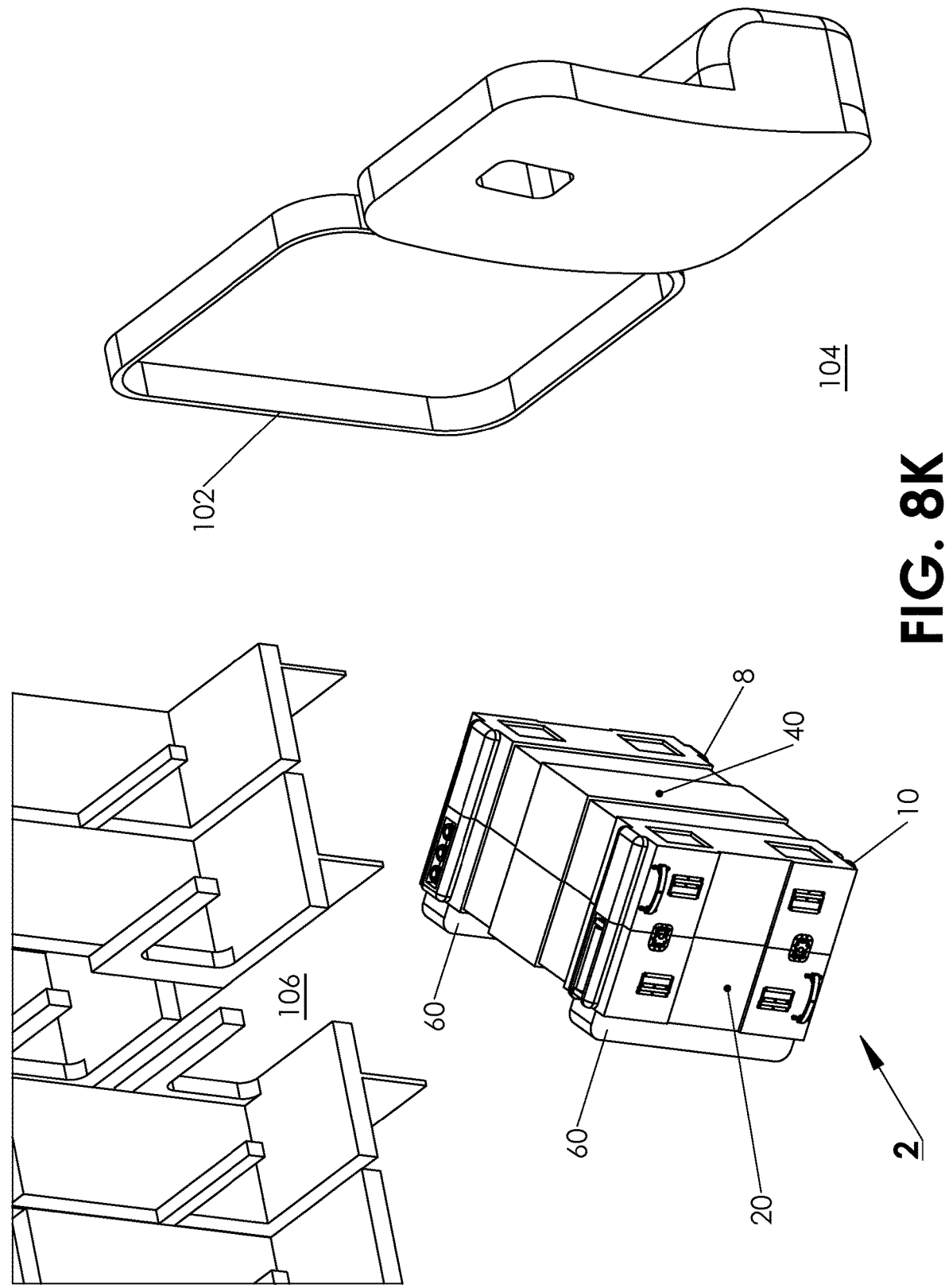
Figure 8L:
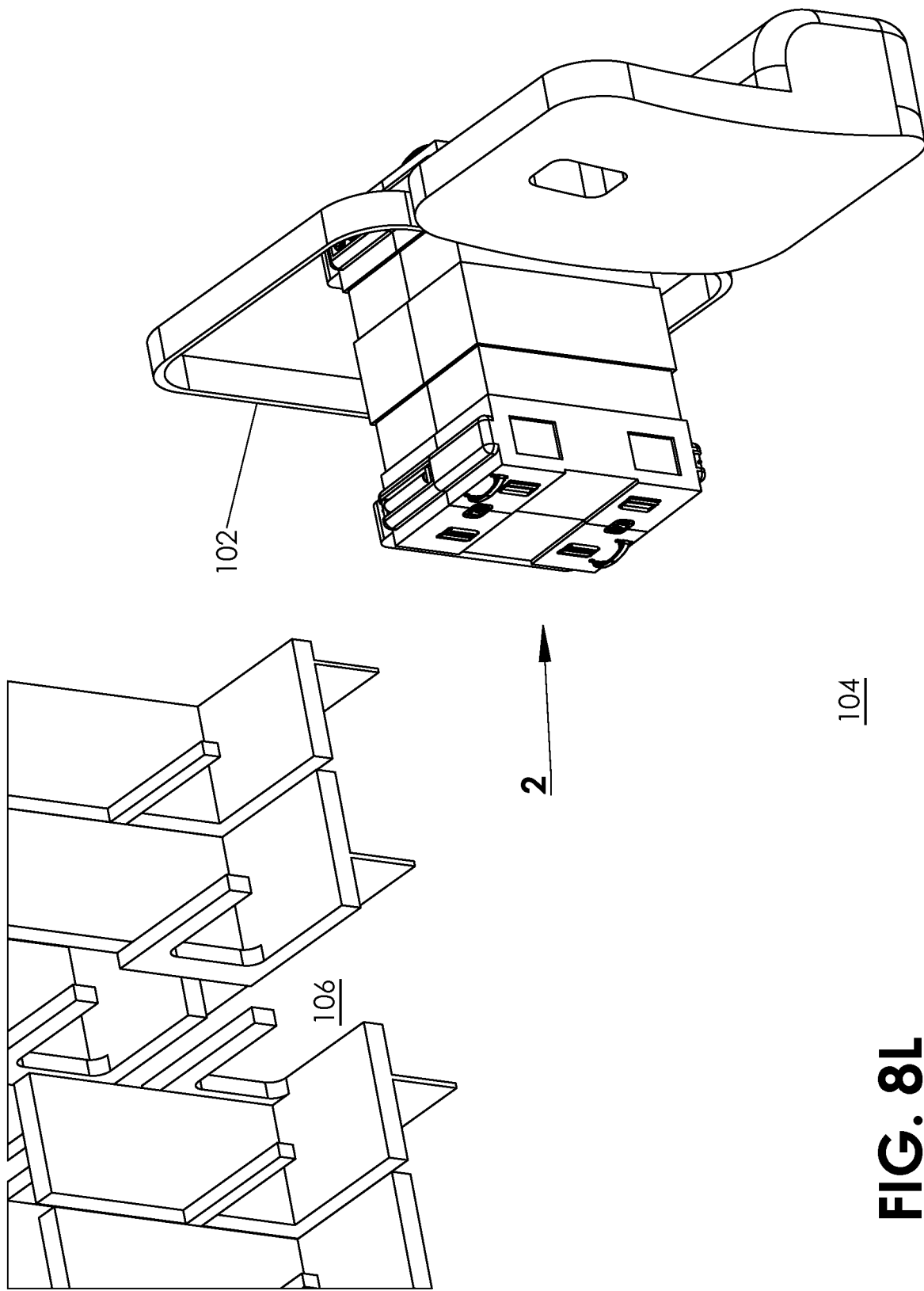
Figure 8M:
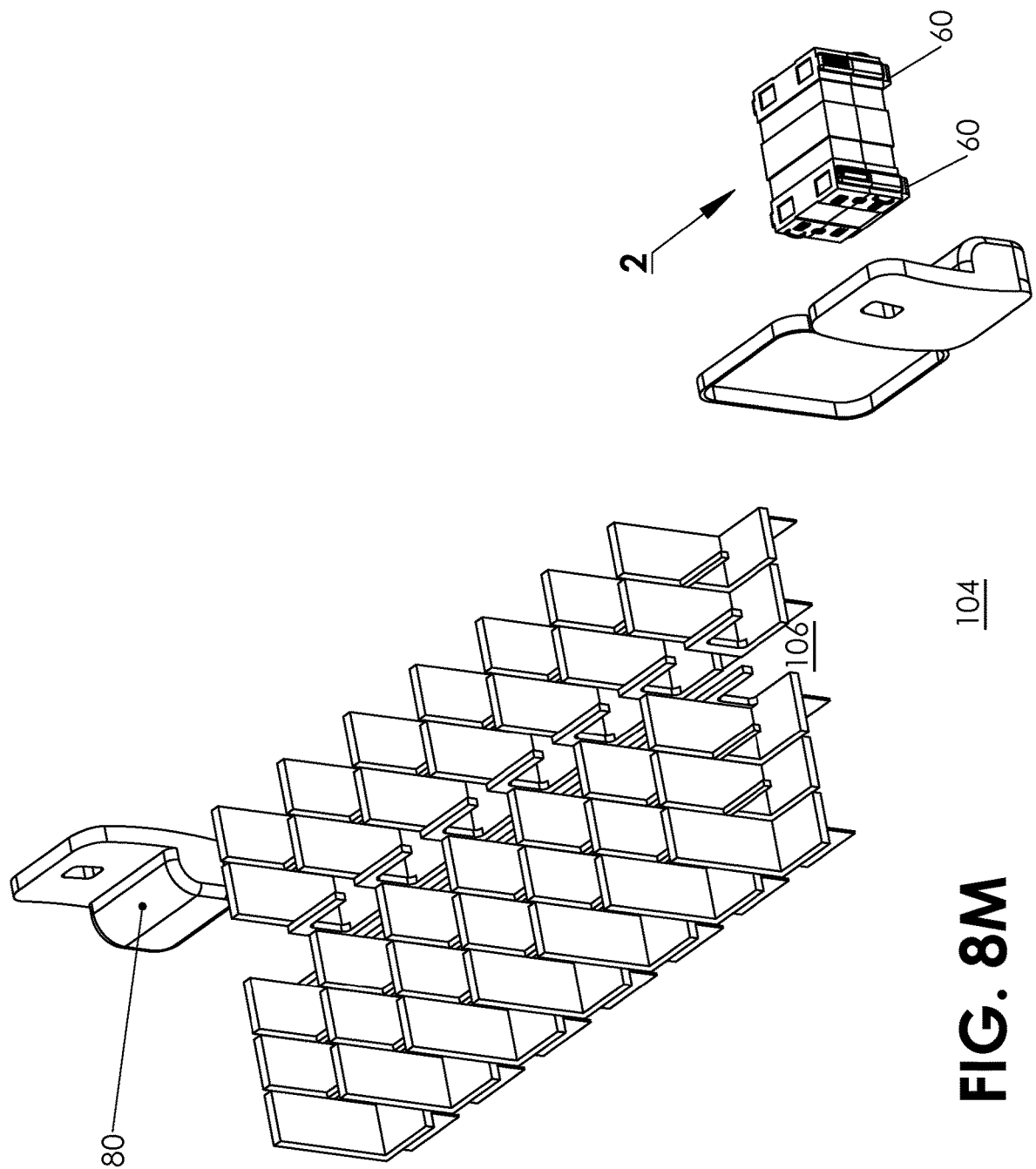

From the staging area, the container or container portion, including the serviceable aircraft emergency slide, can be moved near the installation point and aligned with the installation point as seen in FIGS. 8E and 8F. The serviceable aircraft emergency slide can then be installed at the installation point as seen in FIG. 8F-8H. In the case with an empty container, the container can subsequently be removed from the aircraft through the main door as seen in FIGS. 8K-8M. In this case, the now empty new serviceable slide container portion can be rejoined at the service area with the container portion having the unserviceable slide as seen in FIG. 8K. From the description above, it can be seen that the containers and methods disclosed herein enhance personnel safety regarding lifting and handling of heavy aircraft emergency slides. The containers and methods disclosed herein also facilitate positioning of the slides near installation and removal points, orienting the slides properly, and further preventing awkward handling situations.

It should be apparent that the foregoing describes only selected embodiments of the invention, and numerous changes and modifications may be made to the embodiments disclosed herein by one of ordinary skill in the art without departing from the general spirit and scope of the invention as defined by the following claims and equivalents thereof.

What is claimed is:

1. A method of servicing an unserviceable aircraft emergency slide, comprising:

transporting to a service area in or at an aircraft a container in a shipping configuration with an at least two members of the container detachably coupled to one another;

separating the container into a separated configuration at the service area wherein a first member of the at least two members of the container is separated from a second member of the at least two members of the container;

retaining in the second member of the at least two members of the container a serviceable aircraft emergency slide with emergency slide retention members;

moving the first of the at least two members of the container to an installation point with an unserviceable aircraft emergency slide;

engaging the unserviceable aircraft emergency slide with the first of the at least two members of the container;

removing the engaged unserviceable aircraft emergency slide from the installation point such that unserviceable aircraft emergency slide is within the first of the at least two members of the container;

moving the second of the at least two members of the container with the serviceable emergency slide to the installation point;

releasing and installing the serviceable emergency slide from said second member of the container;

and reattaching said first and second members of the at least two members of the container into the transport configuration.

2. The method of servicing an unserviceable aircraft emergency slide of claim 1, further comprising the step of moving the second member of the at least two members of the container to a staging area having the first container and the unserviceable emergency aircraft slide therein after releasing and installing the serviceable emergency slide.

3. The method of servicing an unserviceable aircraft emergency slide of claim 2, wherein the step of moving the second member of the at least two members of the container to a staging area further comprises moving the second member of the at least two members of the container from the installation point along an aisle of the aircraft between rows of seats using an at least one translation assist member on the second member which is in contact with a floor of the aircraft.

4. The method of servicing an unserviceable aircraft emergency slide of claim 1, wherein the step of moving the first member of the at least two members of the container further comprises moving the first member along an aisle of the aircraft between rows of seats using an at least one translation assist member on the first member which is in contact with a floor of the aircraft.

5. The method of servicing an unserviceable aircraft emergency slide of claim 1, wherein the step of moving the second member of the at least two members of the container with the serviceable emergency aircraft slide further comprises moving the second member of the at least two members of the container along an aisle of the aircraft between rows of seats using an at least one translation assist member on the second member which is in contact with a floor of the aircraft.

6. The method of servicing an unserviceable aircraft emergency slide of claim 1, wherein the method step of engaging the unserviceable aircraft emergency slide further comprises engaging a retaining member.

7. The method of servicing an unserviceable aircraft emergency slide of claim 6, wherein the method of engaging the retaining member further comprises engaging a strap as the retaining member so as to retain the unserviceable emergency aircraft slide.

\* \* \* \* \*